(12) United States Patent
Acharya (10) Patent No.: US 8,488,613 B2
(45) Date of Patent: Jul. 16, 2013

(54) SYSTEMS AND METHODS FOR LOW COMPLEXITY USER SCHEDULING

(75) Inventor: Joydeep Acharya, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 13/101,867

(22) Filed: May 5, 2011

(65) Prior Publication Data

US 2012/0281639 A1 Nov. 8, 2012

(51) Int. Cl.
*H04L 12/28* (2006.01)
*H04J 11/00* (2006.01)
*H04W 4/00* (2009.01)

(52) U.S. Cl.
USPC ............... 370/395.21; 370/329; 370/203

(58) Field of Classification Search
USPC .......... 370/468, 328, 329, 395.21, 395.4, 370/331, 332, 253, 254, 203, 208–210, 330, 370/335; 455/452.1
See application file for complete search history.

(56) References Cited

U.S. PATENT DOCUMENTS

| | | | |
|---|---|---|---|
| 6,393,012 | B1 | 5/2002 | Pankaj |
| 8,244,266 | B2 * | 8/2012 | Song et al. ................ 455/452.1 |
| 2007/0171808 | A1 | 7/2007 | Wu et al. |
| 2008/0117881 | A1 | 5/2008 | Golitschek Edler Von Elbwart et al. |
| 2008/0125136 | A1 | 5/2008 | Song et al. |
| 2009/0082028 | A1 | 3/2009 | Hosein et al. |
| 2010/0177725 | A1 | 7/2010 | van Rensburg |
| 2011/0039547 | A1 | 2/2011 | van Rensburg |
| 2011/0164578 | A1 * | 7/2011 | Kim et al. ................... 370/329 |
| 2012/0028667 | A1 * | 2/2012 | Larsson ..................... 455/509 |

OTHER PUBLICATIONS

Z. Shen et al., Low Complexity User Selection Algorithms for Multiuser MIMO Systems with Block Diagonalization, Sep. 2006, pp. 3658-3663, vol. 54, No. 9, IEEE Transactions on Signal Processing.
K. Ko et al., Low Complexity Multiuser MIMO Scheduling with Chordal Distance, Mar. 2008, pp. 80-84, IEEE CISS.
Round-ribin scheduling. Wikipedia. Wikimedia Foundation, Inc., accessed May 3, 2011, <http://en.wikipedia.org/wiki/Round-ribin_scheduling>.
G. Caire et al., Hard Fairness Versus Proportional Fairness in Wireless Communications: The Single-Cell Case, Apr. 2007, pp. 1366-1385, vol. 53, No. 4, IEEE Transactions on Information Theory.
L. Liu et al., Proportional Fair Scheduling for Multi-Cell Multi-User MIMO Systems, Mar. 2010, IEEE CISS.
Report ITU-R M.2135, Guidelines for evaluation of radio interface technologies for IMT-Advanced, 2008, pp. 1-67.

* cited by examiner

*Primary Examiner* — Hanh N Nguyen
(74) *Attorney, Agent, or Firm* — Procopio, Cory, Hargreaves & Savitch LLP (57) ABSTRACT

Systems and methods for scheduling multiple user equipments such as mobiles for transmission in the downlink of a cellular communications system. At each scheduling instant the systems and methods return a set of users who should be scheduled based on the past scheduling history of the users, the current individual link gains of the users to the base station, and how the simultaneous scheduling of multiple users affect each other's performance. Since optimal scheduling for communication systems require high computational complexity, low complexity systems and methods are utilized with a performance that is close to the theoretical optimal solution.

20 Claims, 7 Drawing Sheets

SYSTEMS AND METHODS FOR LOW COMPLEXITY USER SCHEDULING

TECHNICAL FIELD

This invention is generally directed to communication systems, and more specifically, for scheduling multiple users for transmission in communication systems.

BACKGROUND ART

In present and future communication standards, such as the cellular $3^{rd}$ Generation Partnership Project, Long Term Evolution (3GPP-LTE), LTE-Advanced, and Worldwide Interoperability for Microwave Access (WiMAX), both the base station (BS) and user equipments (UE) have multiple antennas. These communication systems are generally referred to as multiple input multiple output (MIMO) systems. In conventional cellular systems, the transmissions by a BS to multiple users are organized into time sequential frames, each of which is divided into a series of subframes, and a single user is assigned for transmission in a respective subframe. However in more recent systems, multiple users can be scheduled for transmission simultaneously using MU-MIMO precoding algorithms.

Figure 1:
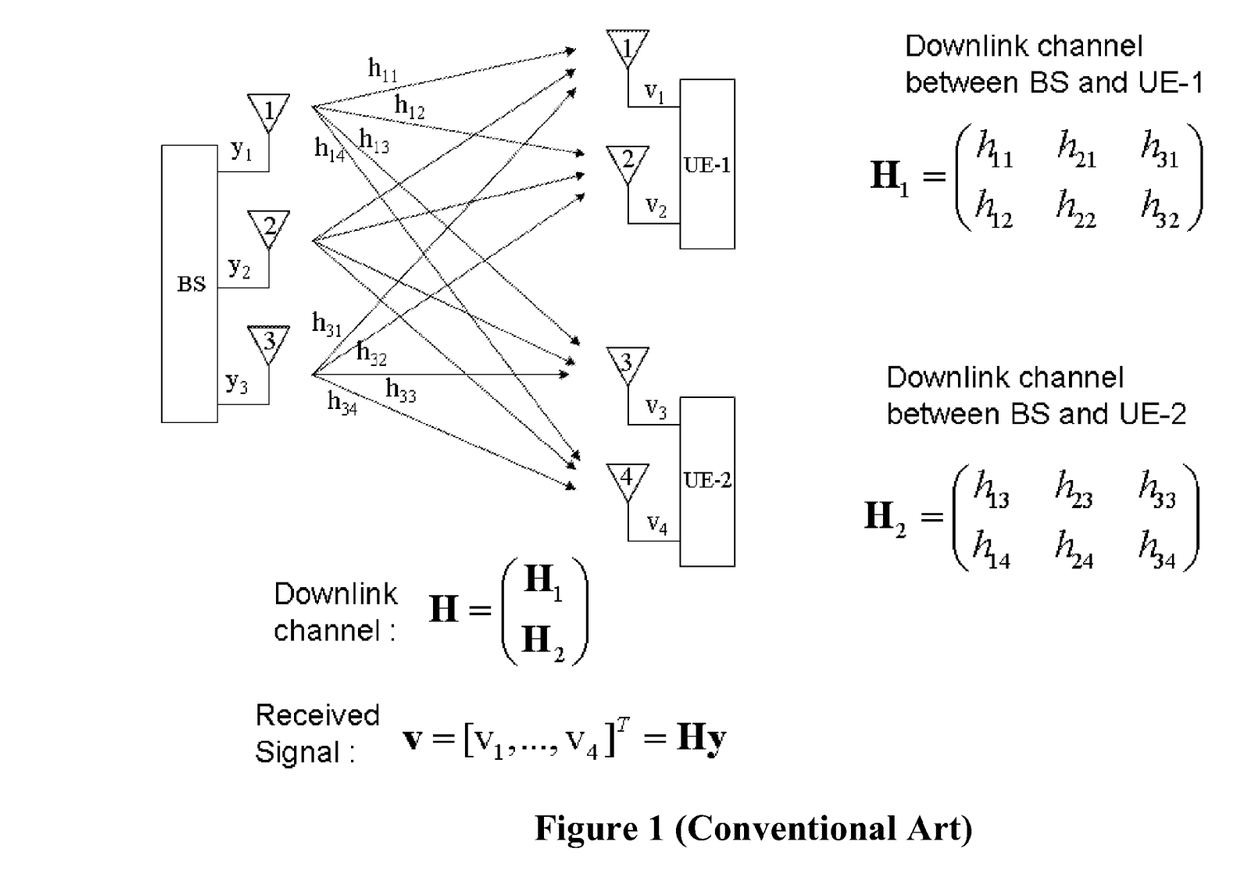
FIG. 1 illustrates an example of a communication system according to the conventional art.

A conventional arrangement for a cellular system is illustrated in FIG. 1 where the BS has multiple antennas (1, 2, 3) that are fed respective signals (y1, y2, y3) destined for the user equipment UE-1, UE-2. Each UE has one or more antennas, with UE-1 shown as having two antennas (1, 2) that deliver signals v1, v2, respectively, and UE-2 having two antennas (3, 4) that deliver signals v3, v4. The downlink from antenna 1 of the BS provides a transmission to each antenna (h11, h12, h13, h14) and similar transmissions are provided by antenna 2 (unnumbered) and antenna 3 (h31, h32, h33, h34) of the BS. The received signal can be represented by a matrix v of signals v1-v4, with T is the transpose operation for the vector, and can further be expressed as channel matrix Hy.

The MIMO Channel

The downlink channel between a base station and several UEs may be represented as a matrix H, where the number of rows (i) in the matrix is equal to the sum of antennas of the several UEs and the number of columns (j) in the matrix is equal to the number of transmit antennas at the base station. For FIG. 1, there are 4 rows for the four antennas (1-4) and 3 columns for the 3 antennas at the BS. The $(i,j)^{th}$ entry to the matrix H represents the complex channel gain $h_{ij}$ between the $i^{th}$ transmit antenna and $j^{th}$ receive antenna, as shown in FIG. 1. In particular, the complex channel gain $h_{ij}$ represents the amplification (or attenuation) that the transmitted signal undergoes in the wireless downlink channel.

The downlink channel H is represented by two downlinks $H_1$ and $H_2$ from BS to each of the UE-1 and UE-2, respectively, and each downlink is represented by a respective matrix H1, H2 having the row and column content as described. For example, the H1 downlink matrix has signals h11, h12, h31, h12, h22 and h32, as shown in FIG. 1.

Chordal Distance

Some conventional algorithms employed by the base station to schedule transmissions on a downlink to the BEs are based on the chordal distance between the channel matrix spaces of two users. This metric determines how 'far apart' the two sub-spaces are located. A discussion of chordal distances appears in K. Ko, J. Lee, "Low complexity MU MIMO scheduling with chordal distance", IEEE CISS March, 2008.

Figure 2:
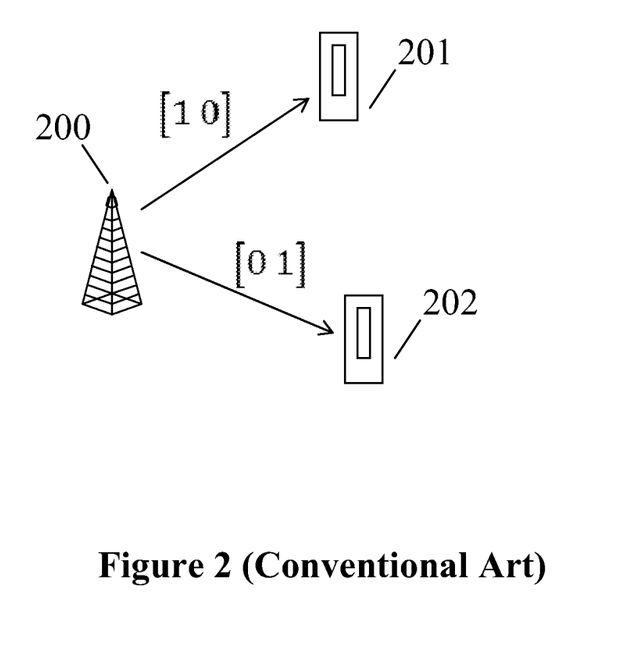
FIG. 2 illustrates an example of chordal distance according to the conventional art.

FIG. 2 illustrates a simple example where a base station 200 transmits to two mobiles over two time subframes. In the first time subframe transmission is to mobile apparatus 201 and in the second time subframe, transmission is to mobile apparatus 202.

Given the different characteristics of the transmissions, the two transmissions do not interfere with each other. By way of representation, let 1 denote a transmission and 0 denote no transmission. The channel of the mobile apparatus 201 can therefore be written as [1 0], and the channel of mobile apparatus 202 can be written as [0 1] respectively. Thus, another way of stating the non-interference condition is to observe that the channel vectors are orthogonal, that is, there is no interference in time or frequency and no overlap. The chordal distance measures the degree of orthogonality of the two channels. In this example, the channels have maximum chordal distance.

The impact of the chordal distance can be appreciated by assuming that a MU-MIMO algorithm picks up two users (User 1 and User 2) in the downlink. Also, assume that there is a precoder T1, and T2 for each user, and that the precoder used is block diagonalization. Under these circumstances, given a noise vector z, a data stream s and the transmitted signal vector at the base station x, the equations representing what was transmitted at the base station and what was received at the mobile can be represented as $y_1 = H_1 x + z_1$ and $y_2 = H_2 x + z_2$ where $x = T_1 s_1 + T_2 s_2$ Precoder $T_1$ is designed so that it lies in the nullspace of the other user's channel $H_2$ so that the signal for User 1 does not cause interference for User 2. Therefore, the precoder is set to $T_1 = N(H_2)$. However doing so modifies the channel of User 1 from $H_1$ to $H_1 T_1$, which could lead to a loss in performance. This loss can be minimized if the channels of the two users are as orthogonal as possible. The chordal distance measures this degree of orthogonality or separation between the two channels.

MU-MIMO Scheduling

Figure 3:
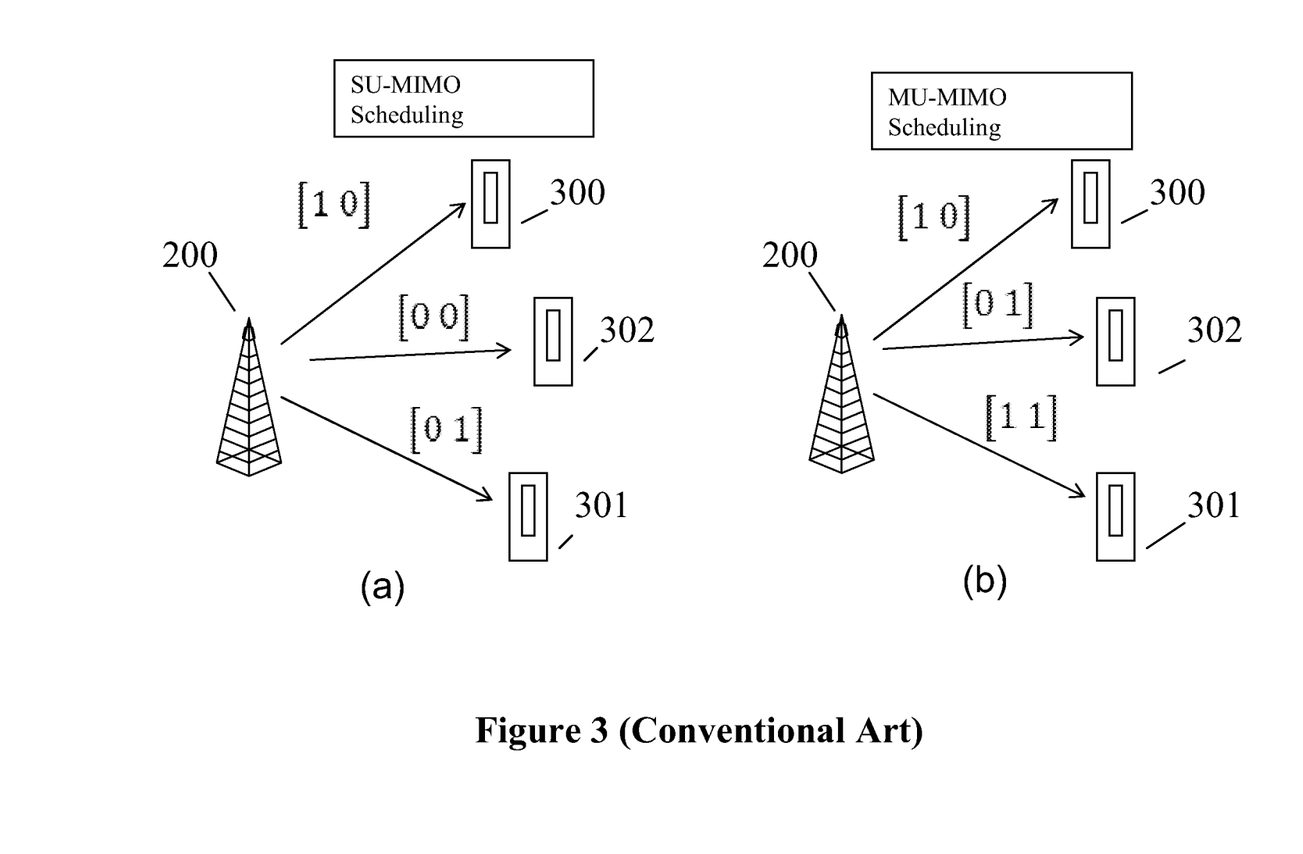

FIGS. 3(a) and 3(b) illustrates an example of SU-MIMO and MU-MIMO scheduling. For SU-MIMO of FIG. 3(a), the base station selects (schedules) one mobile apparatus in each time subframe to which it transmits, while for MU-MIMO in FIG. 3(b), multiple users may be selected. In the example of FIGS. 3(a) and 3(b), the scheduling of three mobile apparatuses are shown over two time subframes. For SU-MIMO of FIG. 3(a), the base station 200 schedules mobile apparatus 300 in time subframe 1 (represented by [1 0]) and mobile apparatus 301 in time subframe 2 (represented by [0 1]). Mobile apparatus 302 is unscheduled (represented by [0 0]). For MU-MIMO of FIG. 3(b), the base station 200 schedules mobile apparatus 300 and 301 in time subframe 1 and mobile apparatus 300 and 302 in time subframe 2.

Multiple mobile apparatuses may be connected to a single base station, which serves all of them in the downlink. However due to the limits in signal processing technology, the base station may not be able to transmit data to all of them at once. In most cellular systems, the service time of the base stations is divided into subframes. For example in 3GPP LTE, the base station decides which mobile to transmit for every subframe of 0.1 ms.

The process that the base station utilizes to decide which user or users to transmit to every subframe is called scheduling. In LTE Rel-8, the base station schedules only a single user in a subframe (over a given frequency band). This is called Single User (SU-MIMO) scheduling. In higher versions of LTE, the base station may select multiple users to transmit to in a subframe. This is called Multiple User (MU-MIMO) scheduling.

Assume that there are K users in a cell who are eligible for receiving data in the downlink in a frame. The base station selects a subset of these users for transmission in a frame as scheduling of all users may lead to performance degradation for all users. There are many algorithms that have been proposed for user selection which maximize different metrics.

For example, several previous algorithms attempt to maximize the sum capacity. However these algorithms are of high computational complexity. Other algorithms attempt to reduce complexity while still maximizing the sum capacity. In cellular systems, however, proportional fairness is usually considered a better metric than sum capacity, as the latter metric tends to pick users based only on their signal strengths. Thus, users that are closer to the base station will get scheduled consistently which is unfair for the cell edge users. Previous MU-MIMO scheduling algorithms with Proportional Fairness (PF) metrics still require an exhaustive search, which requires high computational complexity.

Proportional Fairness

The round-robin scheduler and the proportional far scheduler are examples of two well-known UE schedulers. The round-robin scheduler is one of the simplest schedulers, which assign resource blocks (e.g., time subframes, frequency bands) to each UE in equal portions and in circular order without priority. Proportional fair schedulers (PFS) utilize a fairness consideration among UEs. The PFS schedules a UE when its instantaneous channel quality is high relative to its own average channel condition over time, i.e., it assigns resource block m to UE k if k=k̄, where $$k = \arg\max_{i=1,\cdots,K} \frac{R_i(m)}{T_i}$$

where K is the total number of UEs, $R_i(m)$ is the instantaneous achievable rate of the ith UE in resource block m, and $T_i$ is the long-term average rate of the ith UE. The PFS has been applied in LTE cellular systems.

Figure 4:
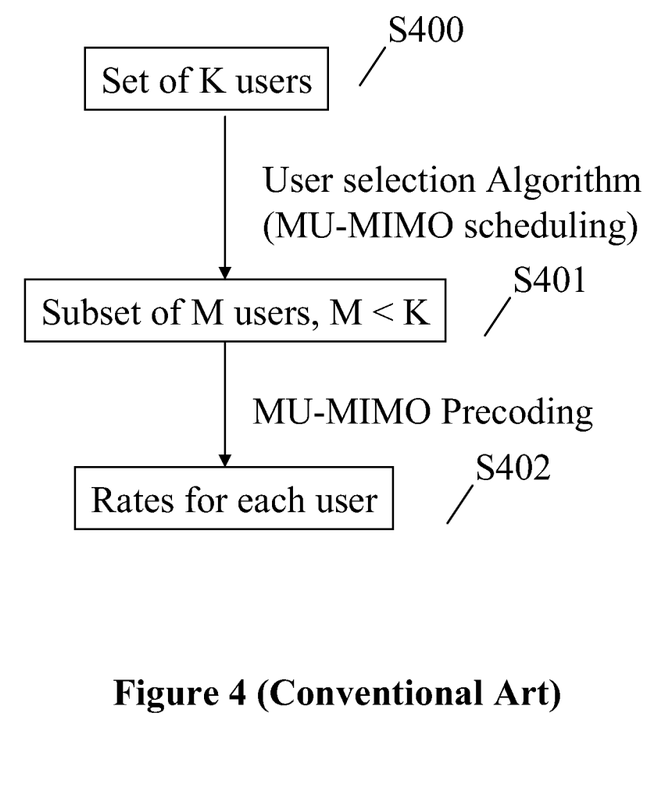
FIG. 4 illustrates exemplary steps of MU-MIMO signal processing according to the conventional art.

FIG. 4 illustrates exemplary steps of conventional MU-MIMO signal processing. MU-MIMO signal processing in the downlink can be explained in the most general terms as follows:

Step S401: Base station and a set of K users who are associated to the base station are identified.

Step S402: At each scheduling instant the base station uses the User Selection Algorithm (such as MU-MIMO scheduling) to decide a subset of users who would receive data in a downlink.

Step S403: The base station transmits to the set of users using a MU-MIMO precoding algorithm at rates set for each user.

The user selection method depends on the precoding used, and the performance of the precoding is affected by the users chosen. Where there are multiple users, all possible pairs of users must be evaluated, resulting in a high number of evaluations. One protocol is to fix one user and to search all other users for a pair, and in this way to calculate a proportional fairness (PF) metric for all users.

When multiple users are scheduled simultaneously for transmission, the PF metric has been modified to the sum of PF metrics of each user in the set of scheduled users where the optimal set is found by exhaustive search. However, this method still requires high computational complexity.

CITATION LIST

Z. Shen, R. Chen, J. Andrews, R. Heath Jr., B. Evans, "Low complexity user selection algorithms for Multiuser MIMO systems with Block Diagonalization", IEEE Trans. Signal Processing, vol 54, no 9, September 2006

K. Ko, J. Lee, "Low complexity MU MIMO scheduling with chordal distance", IEEE CISS March, 2008

G Caire, R. Müller, and R. Knopp, "Hard Fairness Versus Proportional Fairness in Wireless Communications: The Single-cell Case," IEEE Trans. on Information Theory, Vol. 53, pp. 1366-1385, April 2007.

L. Liu, Y-H Nam, J. Zhang, "Proportional fair scheduling for multi-cell multi-user MIMO systems", IEEE CISS March, 2010

ITU M.2135, "Guidelines for evaluation of radio interface technologies for IMT-Advanced"

SUMMARY OF THE INVENTION

Technical Problem

Given the foregoing background, there is a need for new methods and systems that substantially obviate the aforementioned problems associated with known conventional techniques for communication systems. Specifically, there is a need to provide a working scheduler without requiring high computational complexity.

Solution to the Problem

The inventive methodology is directed to methods and systems that substantially obviate one or more of the above and other problems associated with the known conventional techniques for communication systems.

Aspects of the present invention may involve a method for scheduling a plurality of users for a communication system. The method may involve selecting a base case user from the plurality of users for initializing a set of scheduled users; comparing each of the plurality of users to the set of scheduled users based on a metric comprising a proportional fairness metric for said each of the plurality of users and chordal distance between said each of the plurality of users and the set of scheduled users; and selecting said each of the plurality of users for inclusion into the set of scheduled users based on the metric.

Additional aspects may involve a system that includes a plurality of antennas transmitting according to a schedule; and a scheduler unit determining the schedule for a plurality of users by executing a process. The process can involve selecting a base case user from the plurality of users for initializing a set of scheduled users; comparing each of the plurality of users to the set of scheduled users based on a metric comprising a proportional fairness metric for said each of the plurality of users and chordal distance between said each of the plurality of users and the set of scheduled users; and selecting said each of the plurality of users for inclusion into the set of scheduled users based on the metric.

Additional aspects of the invention may include a transmitter, which may involve at least one antenna transmitting to a plurality of users according to a schedule. The schedule can be constructed by a process which includes selecting a base case user from the plurality of users for initializing a set of scheduled users; comparing each of the plurality of users to the set of scheduled users based on a metric comprising a proportional fairness metric for said each of the plurality of users and chordal distance between said each of the plurality of users and the set of scheduled users; and selecting each of the plurality of users for inclusion into the set of scheduled users based on the metric.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

Advantageous Effects of the Invention

The present invention may provide a user scheduler that is relatively close to the optimal solution without incurring the high computational complexity such a scheduler would typically require.

BRIEF DESCRIPTION OF THE DRAWINGS

FIGS. 3($a$) and 3($b$) illustrate an example of a SU-MIMO and a MU-MIMO system according to the conventional art.

FIGS. 5($a$) and 5($b$) illustrate a basic flowchart of an exemplary embodiment of the invention.

DESCRIPTION OF EMBODIMENTS

In the following detailed description of exemplary embodiments, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Embodiments of the invention attempt to calculate the optimal set of users in an iterative way, starting with the optimal user if only one user were to be chosen. At iteration step n, let the set of scheduled users $S(n)=\{s_1, s_2, \ldots, s_n\}$ be of size n and the single user proportional fairness metric of user $s_i$ be $PF(s_i)$. In the next step another user (from the remaining set of users) is temporarily added and this user is the one which maximizes the joint metric that combines the chordal distance between its channel and the channels of the users already scheduled and its PF metric. This temporary user is added to the scheduling set if only a sum PF metric or sum rate of all users increases when this user is added, else the algorithm terminates.

Figure 5A:
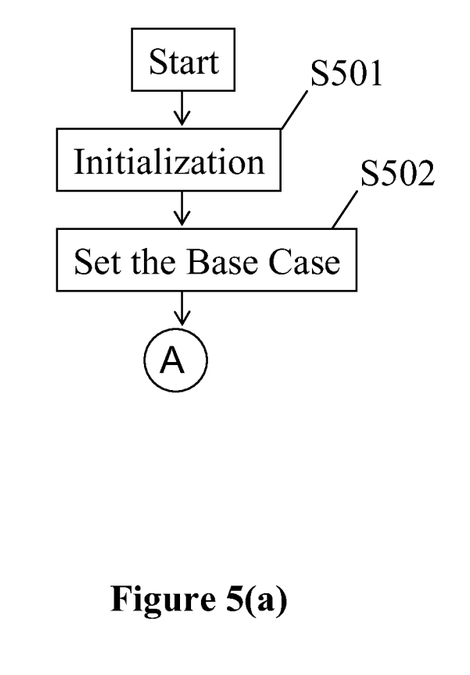
Figure 5B:
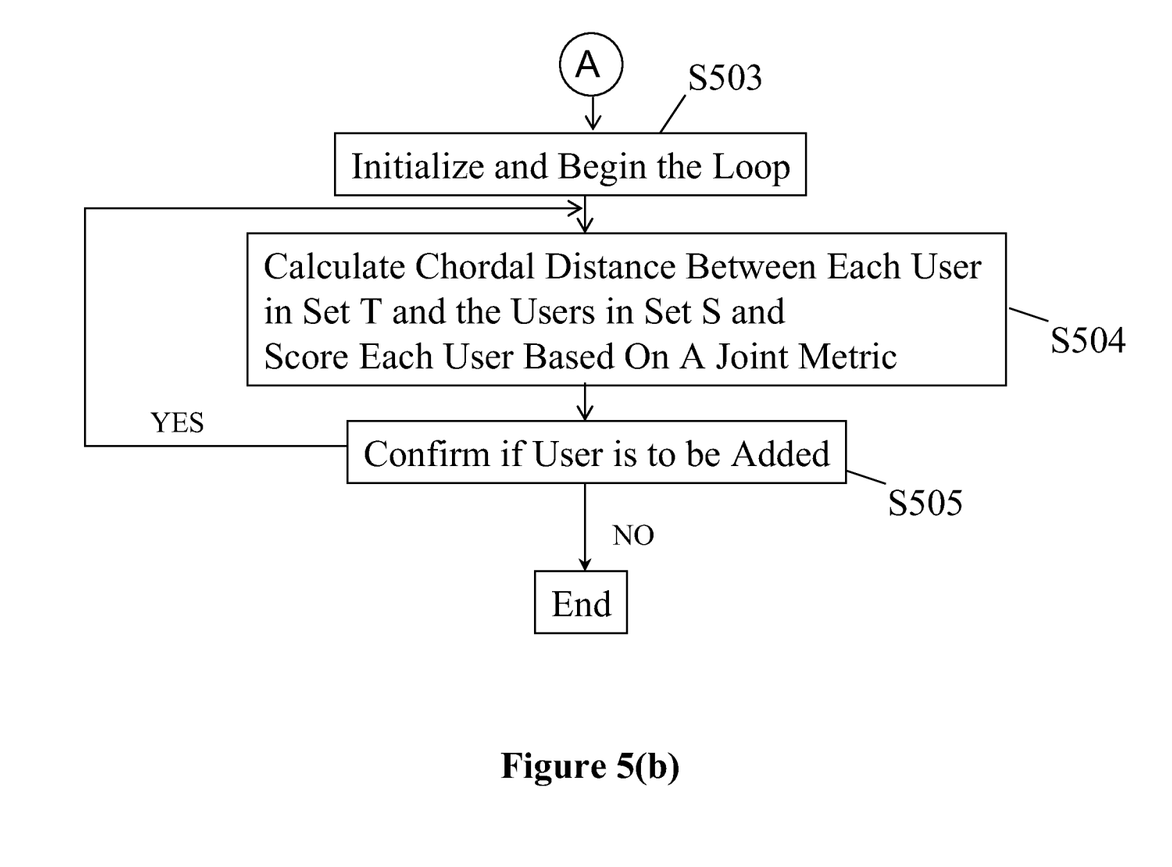

FIGS. 5($a$) and 5($b$) illustrate a basic flowchart of an exemplary embodiment of the invention. Metrics which can be used in conjunction with FIGS. 5($a$) and 5($b$) are explained in detail below.

Metric M1 for user k is the single user PF metric for that user. Denote this by $C_k$.

Metric M2 is defined as $C_k^\alpha |A-H_{k,0}H_{k,0}^H|^{1-\alpha}$ where $C_k$ is the single user PF metric (same as metric M1) and the other quantities are defined below.

$H_{k,0}$ is the basis for channel $H_k$ to user k. $P_0=[P_0, \ldots, H_{s_{i-1}}]$ where $P_0$ is initialized to an empty vector and $A=P_0P_0^H$ and $s_i$ is the mobile who maximized metric M2 at the last iteration step. The constant $\alpha$ denotes how much weight to give to the PF value in metric M2. For example if $\alpha=1$, then metric M2 is totally the PF metric. The value of $\alpha$ can be chosen experimentally to maximize the performance.

Metric M3 is the sum rate of all mobiles in a set after a MU-MIMO precoding algorithm (block diagonalization in this case).

Step S501: Initialization. Let T be the set of users who are potential candidates for getting scheduled. Let S be the set of users who already are selected to be scheduled. Set T, therefore, initially contains all K users who are associated with the base station. Set S is initially empty. Note that at any given point in time, set S and set T have mutually exclusive users and they add up to the total K users in the system. Input set of users T and their channels.

Step S502: Establishing the Base Case. The base station calculates metric Ck for the kth user with Ck=the single user proportional fair metric of user k. Choose the first user to be the one who maximizes this PF metric and call this user s1. Add this user to set S and subtract this user from set T. For example, utilizing the above mentioned metrics, compute the first user in scheduled set S, where $S(1)=\arg \max_i$ Metric $M1(H_i)$ over all users in set T.

Step S503: Initialize and Start the Loop. Determine the maximum possible number of users who can be scheduled. As an example let the base station have four antennas and each mobile apparatus have one antenna each. Thus the base station can schedule 1/2/3/4 users but not more with four antennas, the base station can send a maximum of four independent streams of data. For each of the possible number of users who can be scheduled, the base station runs a loop and adds one user at a time if the overall performance (as determined by a metric) improves.

Step S504: Calculate Chordal Distance Between Each User in Set T and the Users in Set S and Score Each User Based On A Joint Metric. In each stage of the loop, determine the users in set S who have been already been added to the Scheduling Set S in the last stage of the loop. Form a concatenated channel of all users in S. Consider each user in set T individually and calculate the chordal distance of the channel of the users in set T and the concatenated channel, to give an indication of how separated each user is from the other users in the scheduled set. Consider a joint metric where the chordal distance of an user in set T is combined with the PF metric of the user. Determine the user in set T who maximizes this metric. For example, utilizing the above mentioned metrics, from the remaining users T, calculate the user who maximizes metric M2(H(S), H(T)) which depends on the strength of their channels H(T) and how they correlate to the channel of the users who have already been scheduled, H(S).

Step S505: Confirm if User is to be Added. Temporarily add this user in the set S of scheduled users and check if the sum rate (or log of sum of average rates) increases as a result (as compared to the users in original S) according to a metric. If yes (YES), then add this user to set S and subtract the user from set T and repeat the process. If not (NO), then use set S as the final set and end the loop. For example, utilizing the above mentioned metrics, utilizing above mentioned metrics, temporarily add this user to a temporary user set S_Temp and define metric M3 that operates on sets S and S_Temp. If M3(S)>M3(S_Temp), then set S=S_Temp and repeat the loop. If not, then the set of users is S and the loop is ended.

AN ILLUSTRATIVE EXAMPLE

Below is an example of an implementation of embodiments of the invention. Suppose there is a system of five users (mobile apparatuses) with two antennas each and the base station has four antennas. MU-MIMO precoding can pick up one or two users as the base station can send a maximum of 4 independent streams of data with its four antennas. Assume that each mobile apparatus receives independent streams of data in its antenna.

a) The set of users is T=[1, 2, 3, 4, 5]. Initially when none of the users have been scheduled, their throughputs (denoted by Tr) are all zero. Initialize them to a low number $\epsilon$. Thus, Tr=[$\epsilon$, $\epsilon$, $\epsilon$, $\epsilon$, $\epsilon$].

b) Compute the single user rates for UE at 'k' if the base station were to schedule only UE at k. This depends on the strength of the channels $H_k$. Let the rates be R=[0.1, 0.2 0.5, 0.4, 0.3].

c) The PF metric picks up the user with the maximum value of $C_k = R_k/Tr_k$. Thus, in this example, user 3 is selected. Set S={3} and the set of remaining users is T={1, 2, 4, 5}.

d) For each of the remaining users in set T calculate the metric $C_k^{\alpha} |A - H_{k,0} H_{k,0}^H|^{1-\alpha}$ Let the values be [1, 3.5, 4.5, 2.7]. Since the third entry is the highest, select the third entry and check with set T check which user the entry corresponds to. In this case it is user 4.

e) Temporarily add user 4 to the set of scheduled users. Thus S_temp={3, 4}. Now calculate the sum rate of this set with MU-MIMO precoding and call it M3(S_temp). Calculate the sum rate of the set of scheduled users S (till the last step of iteration) and call it M3(S). If M3(S)>M3(S_temp) stop the iterative process and declare that the set of scheduled users is S. (Thus user 4 is not added.) If M3(S)<M3(S_temp), add user 4 to the set of scheduled users. Thus set S after this round of iteration is S={3, 4}. The set of remaining users is T={1, 2, 5}. Go back to step d) and resume the algorithm.

Figure 6:
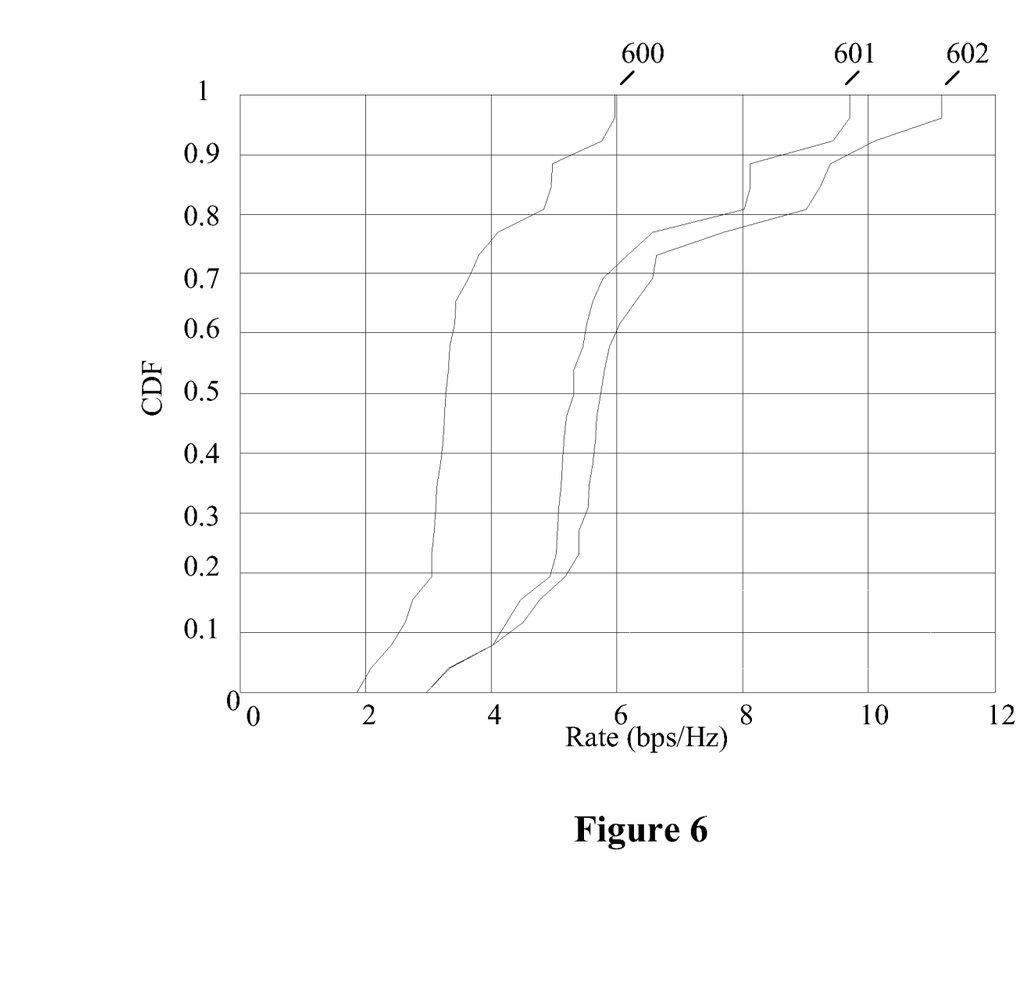
FIG. 6 illustrates a comparison of achievable CDF rates of an embodiment of the invention with that of conventional transmission schemes.

FIG. 6 illustrates a comparison of throughput rates between an embodiment of the invention and conventional schemes. The throughput rates are determined within a 3GPP Urban Macrocell scenario with 30 users and a single cell system with a radius of 500 m with 10 users dropped per sector uniformly. Realistic values of channel gain and antenna patterns are considered as per ITU specifications. Embodiments of the invention 601 tend to offer significant gains over SU-MIMO scheduling 600 and is marginally inferior to the conventional Exhaustive Search schemes 602.

However, from a complexity viewpoint, the Exhaustive Search method is the most complex. Let M be denoted as the number of transmitter antennas at the base station, N be denoted as the number of receiver antennas at each UE, and K be denoted as the Number of UEs associated with a base station. The Exhaustive Search method would have a complexity order of:

$$\psi_{es} \approx O\left(\binom{K}{M/N}\left\lfloor\frac{M}{N}\right\rfloor M^3\right)$$

where, $\psi$ denotes number of flops required (i.e. a real addition, multiplication and a division operation are counted as one flop). In comparison, embodiments of the present invention tend to have significantly reduced complexity:

$$\psi_{pm} \approx O\left(K\left\lfloor\frac{M}{N}\right\rfloor M^3\right)$$

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result.

Usually, though not necessarily, these quantities take the form of instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the invention will be apparent to those skilled in the art from consideration of the specification and practice of the invention disclosed herein. Various aspects and/or components of the described embodiments may be used singly or in any combination in a communication system. It is intended that the specification and examples be considered as exemplary only, with a true scope and spirit of the invention being indicated by the following claims.

What is claimed is:

1. A method for scheduling a plurality of users for a communication system, the method comprising:
   a) selecting a base case user from the plurality of users for initializing a set of scheduled users;
   b) comparing each of the plurality of users to the set of scheduled users based on a metric; and
   c) selecting said each of the plurality of users for inclusion into the set of scheduled users based on the metric;
   wherein the metric comprises:
      a proportional fairness metric for said each of the plurality of users; and
      a chordal distance between a channel of the plurality of users and a concatenated channel of the scheduled users in the set of scheduled users.

2. The method of claim 1, further comprising:
   repeating steps b) and c) until a number of users in the set of scheduled users equals a number of antennas in the communication system.

3. The method of claim 1, further comprising:
   repeating steps b) and c) until the user for inclusion fails to increase a sum rate of the set of scheduled users.

4. The method of claim 1, wherein selecting the base case user comprises selecting a user from the plurality of users with a highest proportional fairness metric.

5. The method of claim 1, wherein the comparing further comprises:
   calculating a first sum rate for the set of the scheduled users; temporarily adding said each of the plurality of users into the set of the scheduled users to create a new set; and
   calculating a second sum rate for the set of the scheduled users with the temporarily added said each of the plurality of users.

6. The method of claim 5, wherein the selecting said each of the plurality of users further comprises:
   using the new set as the set of the scheduled users if the second sum rate is greater than the first sum rate.

7. The method of claim 1, wherein the metric is determined by an equation
$C_k^\alpha |A-H_{k,0}H_{k,0}^H|^{1-\alpha}$, wherein:
   H is a channel matrix;
   $C_k$ is a single user PF metric for user k;
   $H_{k,0}$ is a basis for channel $H_k$ for user k;
   $A=P_0 P_0^H$, wherein $P_0=[P_0, \ldots, H_{S_{i-1}}]$, wherein $P_0$ is initialized to an empty vector, $s_i$ represents a user previously added into the set of scheduled users; and
   $\alpha$ is a weight assigned to the PF metric.

8. A system, comprising:
   a plurality of antennas transmitting according to a schedule; and
   a scheduler unit determining the schedule for a plurality of users by executing a process, the process comprising:
      a) selecting a base case user from the plurality of users for initializing a set of scheduled users;
      b) comparing each of the plurality of users to the set of scheduled users based on a metric; and
      c) selecting said each of the plurality of users for inclusion into the set of scheduled users based on the metric;
      wherein the metric comprises:
         a proportional fairness metric for said each of the plurality of users; and
         a chordal distance between a channel of the plurality of users and a concatenated channel of the scheduled users in the set of scheduled users.

9. The system of claim 8, wherein the scheduler unit repeats steps b) and c) until a number of users in the set of scheduled users equals a number of the plurality of antennas.

10. The system of claim 8, wherein the scheduler unit repeats steps b) and c) until the user for inclusion fails to increase a sum rate of the set of scheduled users.

11. The system of claim 8, wherein selecting the base case user comprises selecting a user from the plurality of users with a highest proportional fairness metric.

12. The system of claim 8, wherein the comparing further comprises:
   calculating a first sum rate for the set of the scheduled users; temporarily adding said each of the plurality of users into the set of the scheduled users to create a new set; and
   calculating a second sum rate for the set of the scheduled users with the temporarily added said each of the plurality of users.

13. The system of claim 8, wherein the selecting said each of the plurality of users further comprises:
   using the new set as the set of the scheduled users if the second sum rate is greater than the first sum rate.

14. The system of claim 8, wherein the system is a base station.

15. A transmitter comprising:
   at least one antenna transmitting to a plurality of users according to a schedule, the schedule constructed by a process comprising:
      a) selecting a base case user from the plurality of users for initializing a set of scheduled users;
      b) comparing each of the plurality of users to the set of scheduled users based on a metric; and
      c) selecting said each of the plurality of users for inclusion into the set of scheduled users based on the metric;

wherein the metric comprises:
- a proportional fairness metric for said each of the plurality of users; and
- a chordal distance between a channel of the plurality of users and a concatenated channel of the scheduled users in the set of scheduled users.

16. The transmitter of claim 15, wherein the process further comprises repeating steps b) and c) until a number of users in the set of scheduled users equals a number of the at least one antenna.

17. The transmitter of claim 15, wherein the process further comprises repeating steps b) and c) until the user for inclusion fails to increase a sum rate of the set of scheduled users.

18. The transmitter of claim 15, wherein selecting the base case user comprises selecting a user from the plurality of users with a highest proportional fairness metric.

19. The transmitter of claim 15, wherein the comparing further comprises:
- calculating a first sum rate for the set of the scheduled users;
- temporarily adding said each of the plurality of users into the set of the scheduled users to create a new set; and
- calculating a second sum rate for the set of the scheduled users with the temporarily added said each of the plurality of users.

20. The transmitter of claim 19, wherein the selecting said each of the plurality of users further comprises:
- using the new set as the set of the scheduled users if the second sum rate is greater than the first sum rate.

* * * * *